L. S. SZUMKOWSKI.
AUTOMOBILE TRACTOR.
APPLICATION FILED DEC. 17, 1917.
1,350,889.
Patented Aug. 24, 1920.
2 SHEETS—SHEET 2.
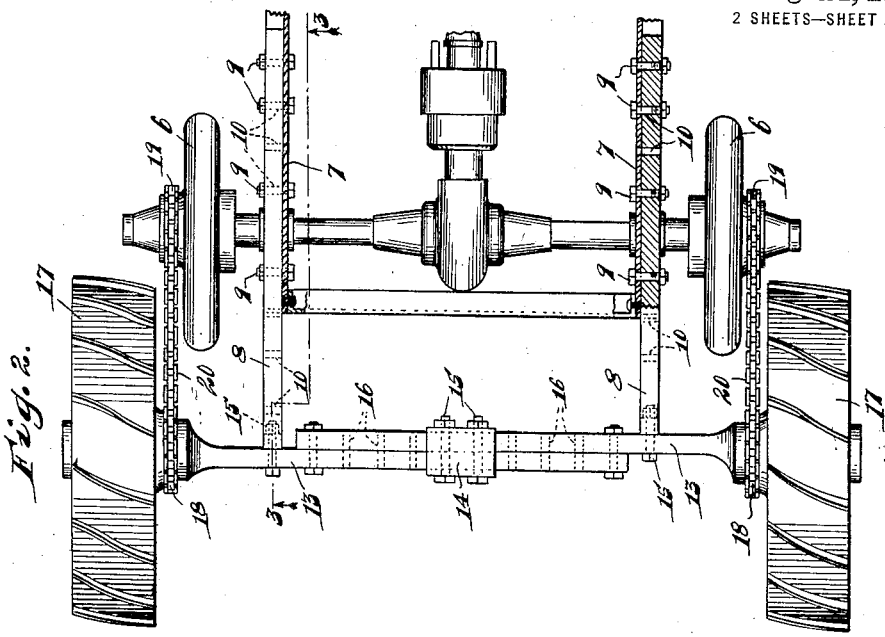
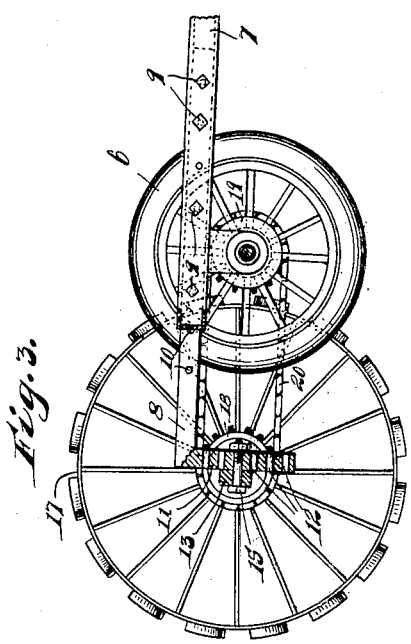
Witnesses
C. E. Wessels.
A. A. Olson.
Inventor:
Leonard S. Szumkowski,
By Joshua R. H. Potts
his Attorney.

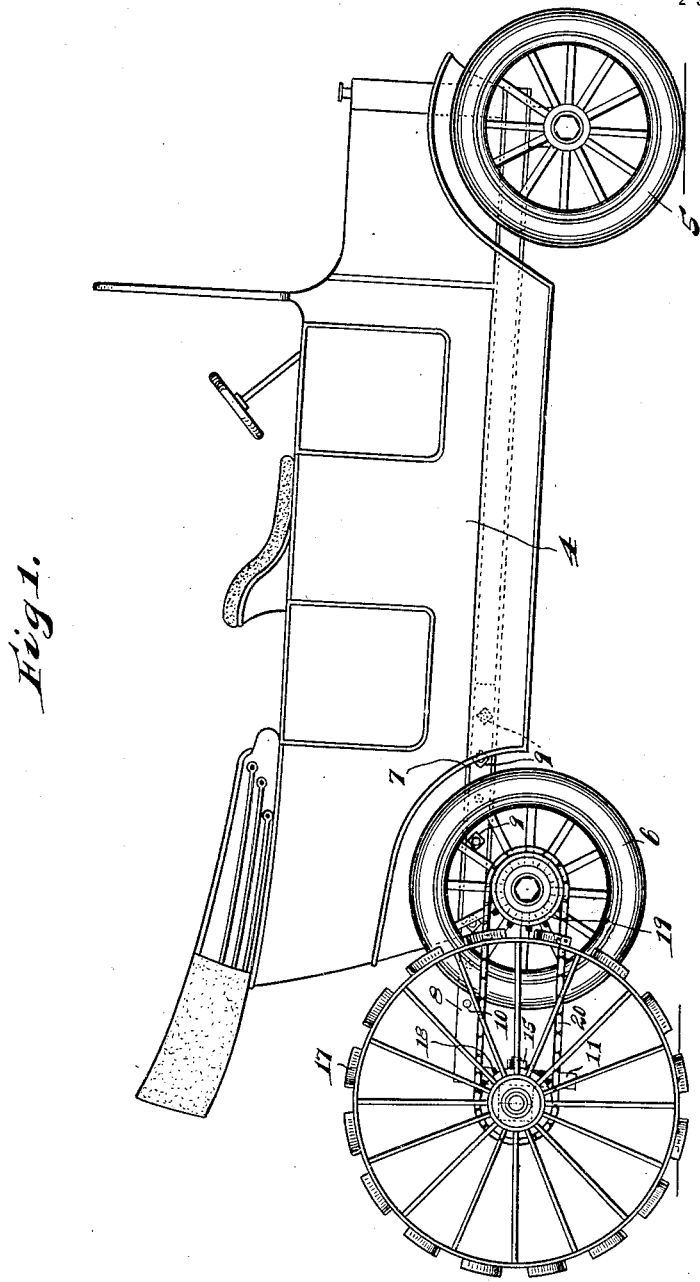

UNITED STATES PATENT OFFICE.

LEONARD S. SZUMKOWSKI, OF CHICAGO, ILLINOIS, ASSIGNOR TO URSUS MOTOR COMPANY, OF CHICAGO, ILLINOIS.

AUTOMOBILE TRACTOR.

1,350,889.  Specification of Letters Patent.  Patented Aug. 24, 1920.

Application filed December 17, 1917. Serial No. 207,505.

*To all whom it may concern:*

Be it known that I, LEONARD S. SZUMKOWSKI, a citizen of the United States, and a resident of the city of Chicago, county of Cook, and State of Illinois, have invented certain new and useful Improvements in Automobile Tractors, of which the following is a specification.

My invention relates to improvements in automobile tractors, and has for its object the production of a construction through the medium of which the ordinary automobile pleasure car may be readily and expeditiously converted into a tractor for agricultural purposes and the like.

A further object is the production of a construction as mentioned, which will be durable and economical, and which may be readily and easily applied and detached.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of an automobile equipped with tractor wheel mechanism, embodying the invention, Fig. 2, a partially sectional top plan view of the rearward end portion of the construction seen in Fig. 1, with the top or body of the automobile removed, and Fig. 3, a section taken on substantially line 3—3 of Fig. 2.

The preferred form of construction as illustrated in the drawings is designed for use in connection with an automobile of the conventional pleasure car type as seen at 4. Said automobile comprises the usual front steering wheels 5, rear driving wheels 6, and longitudinal channeled frame bars 7.

The attachment embodying the subject-matter of this application comprises a pair of elongated bars 8, which are adapted for rigid fastening as by means of bolts 9 to the rearward ends of frame bars 7 of the automobile. Said bars 8 are adapted to fit snugly in the channels of bars 7 and said parts being provided with registrable openings 10 to accommodate bolts 9.

The bars 8 project rearwardly and the rearward ends thereof are formed with vertically extending portions 11 in which are formed spaced openings or perforations 12.

Coöperating with said portions 11 of bars 8 is a longitudinally adjustable axle 13 formed of two overlapping sections, the overlapping portions of which are embraced by a retaining sleeve 14. The parts are secured together by bolts 15, a plurality of spaced perforations or openings 16 being provided in the parts for the accommodation of said bolts, the arrangement being such as to permit of shifting of the axle parts relatively to each other in order to adjust the same to various widths of automobiles in connection with which the device may be employed. Likewise the connection of the axle with the vertically disposed rearward end portions of bars 8 is such as to permit of vertical adjustment of the axle to adapt the construction for use under varying conditions. Upon the ends of axle 13 are mounted tractor wheels 17 of a diameter such that when the device is applied to an automobile, the driving wheels 6 thereof will be elevated to a position out of contact with the ground, the full weight of the rearward end of the automobile being borne by said tractor wheels. The tractor wheel and driving wheel at each side of the vehicle are provided with sprocket wheels 18 and 19 respectively, around which passes an endless sprocket chain 20. Thus an operative connection is established between the motor of the automobile and the tractor wheels through the medium of the driving wheels of the automobile. With this arrangement then, it will be seen that the automobile may be utilized for ordinary travel, and, when it is desired to employ the same as a tractor, it is only necessary to jack-up the rearward end of the automobile, apply the tractor wheels and connect the same with the driving wheels, through the medium of chains 20. When the vehicle is again used for ordinary purposes, it is only necessary to remove the chains 20 and detach the axle 13 carrying the tractor wheels, this being accomplished very easily and expeditiously.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of a motor-driven vehicle having driving wheels at one end; supplemental tractor wheels detachably connected with the vehicle, said tractor wheels, when applied, being adapted to elevate said driving wheels to a position out of contact with the ground, the connection of said tractor wheels with said vehicle comprising two bars detachably connected with and projecting rearwardly from said vehicle; a longitudinally adjustable axle carrying said tractor wheels; and means for operatively connecting said tractor wheels with said driving wheels, substantially as described.

2. The combination of a motor-driven vehicle having driving wheels at one end; supplemental tractor wheels detachably connected with the vehicle, said tractor wheels, when applied, being adapted to elevate said driving wheels to a position out of contact with the ground, the connection of said tractor wheels with said vehicle comprising two bars detachably connected with and projecting rearwardly from said vehicle; a longitudinally adjustable axle carrying said tractor wheels; means for operatively connecting said tractor wheels with said driving wheels, said axle comprising a plurality of overlapping longitudinally adjustable sections; and means for clamping said sections together in positions of adjustment, substantially as described.

3. The combination of a motor-driven vehicle having driving wheels at one end; supplemental tractor wheels detachably connected with the vehicle, said tractor wheels, when applied, being adapted to elevate said driving wheels to a position out of contact with the ground, the connection of said tractor wheels with said vehicle comprising two bars detachably connected with and projecting rearwardly from said vehicle; a longitudinally adjustable axle carrying said tractor wheels; means for operatively connecting said tractor wheels with said driving wheels, said axle comprising a plurality of overlapping longitudinally adjustable sections; and a sleeve embracing the overlapping portions of said axle sections, substantially as described.

4. The combination of a motor-driven vehicle having driving wheels at one end; supplemental tractor wheels detachably connected with the vehicle, said tractor wheels, when applied, being adapted to elevate said driving wheels to a position out of contact with the ground, the connection of said tractor wheels with said vehicle comprising two bars detachably connected with and projecting rearwardly from said vehicle; an adjustable connection between said bars and said tractor wheels, the rearward end portions of said bars being vertically disposed; and an axle carrying said tractor wheels and connected with said vertically disposed portions of said bars for vertical adjustment thereon, substantially as described.

In testimony whereof I have signed my name to this specification in the presence of two subscribing witnesses.

LEONARD S. SZUMKOWSKI.

Witnesses:
 JOSHUA R. H. POTTS,
 B. G. RICHARDS.